US007620470B1

(12) United States Patent
Hickey et al.

(10) Patent No.: US 7,620,470 B1
(45) Date of Patent: Nov. 17, 2009

(54) METHOD AND APPARATUS FOR IMPASSE DETECTION AND RESOLUTION

(75) Inventors: Susan Hickey, Austin, TX (US);
Edward C. Stewart, Buda, TX (US);
Jason A. Grover, Austin, TX (US);
Cabe W. Nicksic, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 451 days.

(21) Appl. No.: 11/241,023

(22) Filed: Sep. 30, 2005

(51) Int. Cl.
*G06F 19/00* (2006.01)

(52) U.S. Cl. .......................... 700/100; 700/11; 700/28; 700/99; 700/110; 700/114; 700/121

(58) Field of Classification Search .................. 700/11, 700/28, 95, 96, 97, 99–110, 112–116, 121, 700/216, 222; 414/935, 937, 939, 940; 438/5, 438/7, 10, 14; 702/81, 82, 84
See application file for complete search history.

(56) References Cited

U.S. PATENT DOCUMENTS

| 4,807,108 | A  | * | 2/1989 | Ben-Arieh et al. ............ 700/28 |
| 5,193,065 | A  | * | 3/1993 | Guerindon et al. .......... 700/106 |
| 5,347,460 | A  | * | 9/1994 | Gifford et al. ............... 700/121 |
| 7,051,250 | B1 | * | 5/2006 | Allen et al. .................. 714/708 |
| 7,142,939 | B2 | * | 11/2006 | Nonaka et al. .............. 700/121 |
| 2002/0103726 | A1 | * | 8/2002 | Jones et al. ................... 705/28 |

* cited by examiner

*Primary Examiner*—Sean P Shechtman
(74) *Attorney, Agent, or Firm*—Williams, Morgan, & Amerson, P.C.

(57) ABSTRACT

A method, apparatus and a system, for provided for performing an automated process flow adjustment. A semiconductor wafer is processed based upon a routing plan and a predetermined schedule. A fault detection relating to the processing of the semiconductor wafer is performed. Dynamically modifying the predetermined routing plan or the predetermined schedule based upon the fault detection. A predetermined process material delivery plan is dynamically modified based upon the modifying of the routing plan or modifying of the predetermined schedule.

17 Claims, 7 Drawing Sheets

METHOD AND APPARATUS FOR IMPASSE DETECTION AND RESOLUTION

BACKGROUND OF THE INVENTION

1. Field of the Invention

This invention relates generally to semiconductor manufacturing, and more particularly, to a method and apparatus detecting a potential impasse in a process flow and providing a resolution to reduce an interruption resulting from the impasse.

2. Description of the Related Art

The technology explosion in the manufacturing industry has resulted in many new and innovative manufacturing processes. Today's manufacturing processes, particularly semiconductor manufacturing processes, call for a large number of important steps. These process steps are usually vital and, therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing locations that contain different control schemes.

Generally, a set of processing steps is performed across a group of semiconductor wafers, sometimes referred to as a lot. For example, a process layer that may be composed of a variety of different materials may be formed across a semiconductor wafer. Thereafter, a patterned layer of photoresist may be formed across the process layer using known photolithography techniques. Typically, an etch process is then performed across the process layer using a patterned layer of photoresist as a mask. This etching process results in the formation of various features or objects in the process layer. Such features may be used as, for example, a gate electrode structure for transistors. Many times, trench isolation structures are also formed across the substrate of the semiconductor wafer to isolate electrical areas across a semiconductor wafer. One example of an isolation structure that can be used is a shallow trench isolation (STI) structure.

The manufacturing tools within a semiconductor manufacturing facility typically communicate with a manufacturing framework or a network of processing modules. Each manufacturing tool is generally connected to an equipment interface. The equipment interface is connected to a machine interface to which a manufacturing network is connected, thereby facilitating communications between the manufacturing tool and the manufacturing framework. The machine interface can generally be part of an advanced process control (APC) system. The APC system initiates a control script, which can be a software program that automatically retrieves the data needed to execute a manufacturing process.

Figure 1:
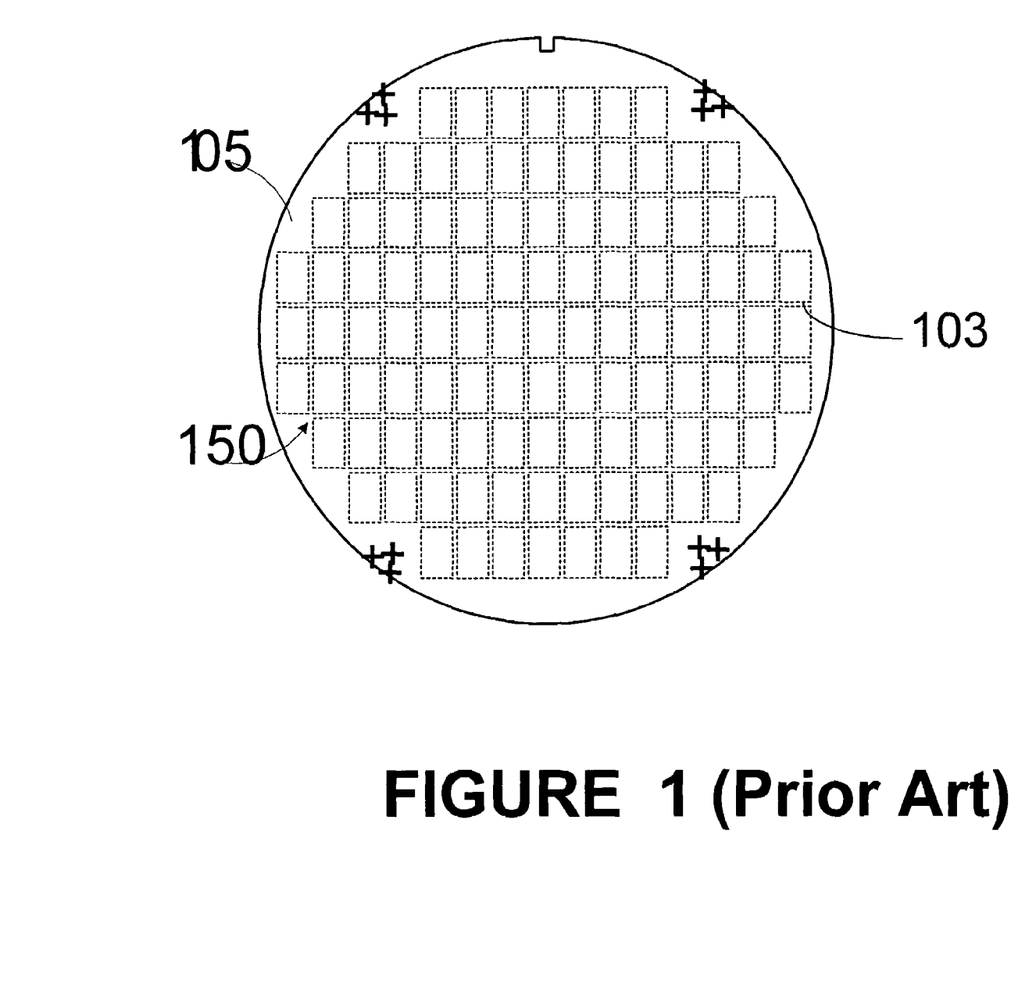
FIG. 1 illustrates a stylized depiction of a semiconductor wafer that may be processed by a semiconductor manufacturing system.

FIG. 1 illustrates a typical semiconductor wafer 105. The semiconductor wafer 105 typically includes a plurality of individual semiconductor die 103 arranged in a grid 150. Using known photolithography processes and equipment, a patterned layer of photoresist may be formed across one or more process layers that are to be patterned. As part of the photolithography process, an exposure process is typically performed by a stepper on single or multiple die 103 locations at a time, depending on the specific photomask employed. The patterned photoresist layer can be used as a mask during etching processes, wet or dry, performed on the underlying layer or layers of material, e.g., a layer of polysilicon, metal or insulating material, to transfer the desired pattern to the underlying layer. The patterned layer of photoresist is comprised of a plurality of features, e.g., line-type features or opening-type features that are to be replicated in an underlying process layer.

Figure 2:
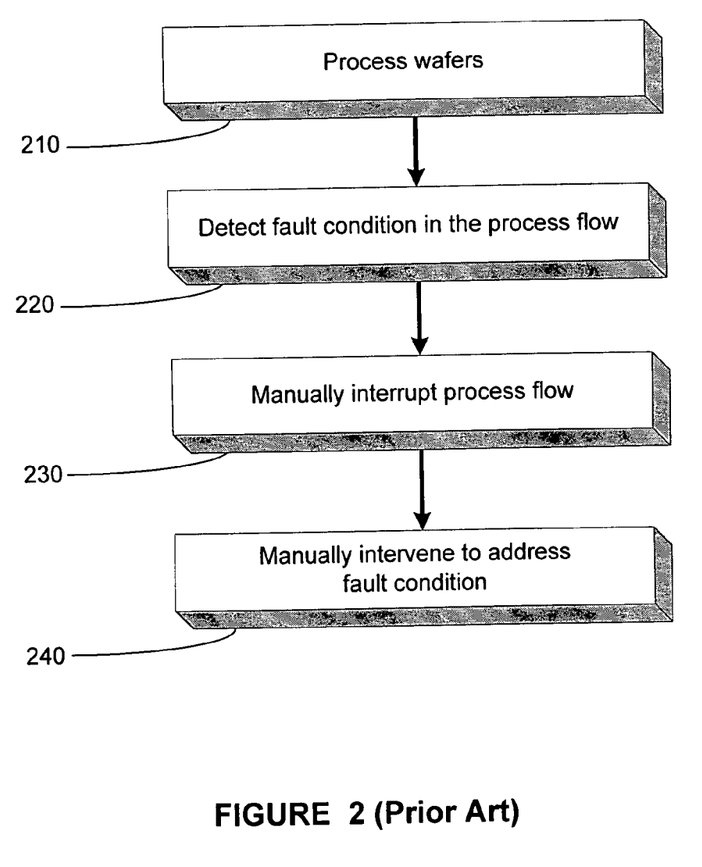
FIG. 2 illustrates a flowchart depiction of a prior art method for processing semiconductor wafers.

Turning now to FIG. 2, a flowchart depiction of an illustrative prior art process flow is depicted. A manufacturing system processes one or more wafers from a lot (block 210). A process flow may be created by the manufacturing system, wherein several lots of wafers are stepped through various tools in a fabrication facility (fab). Based upon the processing of wafers, the manufacturing system may detect fault conditions in the process flow (block 220). Based upon the fault conditions within the manufacturing system, the process flow is generally interrupted by an operator in order to address any potential manufacturing problems (block 230). Upon interruption of the process flow, the operator may initiate specific corrective action to address the fault conditions in the process flow (block 240). Based upon the intervening process(es) initiated by the operator, various corrective actions may be implemented, such as manually initiating rerouting of specific lots of wafers, manually moving process materials to alternative portions of the manufacturing system, etc.

One of the problems associated with the current methodology of addressing fault conditions includes the fact that significant disruption of the process flow may occur. This introduces inefficiencies in semiconductor wafer processing. Having to address faults through intervention by an operator may cause delays when determining the type(s) of corrective actions to take and implementing them.

Further, state-of-the-art flow of materials throughout a processing system generally requires intervention by an operator to accommodate process flow alterations. Generally, when wafers are rerouted and/or process tasks are rescheduled, changes relating to delivery of various process materials to a number of regions of a fab must be addressed. Therefore, a fault condition in a process flow that is addressed by an operator (e.g., rerouting various wafers lots) may cause a material load imbalance throughout the system. In other words, certain portions of the system may be inadvertently left with inadequate amounts of process materials, or alternatively, with excessive amounts of process materials as a result of process flow alterations. Additionally, manually addressing faults by performing manual rerouting and rescheduling may result in significant inefficiencies and delays in the process flow. These delays may cause appreciable expense and delay in delivery of finished semiconductor products.

The present invention is directed to overcoming, or at least reducing, the effects of one or more of the problems set forth above.

SUMMARY OF THE INVENTION

In one aspect of the present invention, a method is provided for performing an automated process flow adjustment. A workpiece is processed based upon a routing plan and a predetermined schedule. A fault detection relating to the processing of the workpiece performed will dynamically modify the predetermined routing plan or the predetermined schedule based upon the fault detection. A predetermined process material delivery plan is dynamically modified based upon modifying the routing plan or modifying of the predetermined schedule.

In another aspect of the present invention, a method is provided for performing an automated process flow adjustment. A process flow relating to processing a workpiece is monitored. A change in the process flow is detected. An automated modification of a process material delivery process for delivery of material used in processing the workpiece based upon the change in the process flow is performed.

In another aspect of the present invention, a method is provided for performing an automated process flow adjustment. A routing and a schedule for processing a first workpiece and a second workpiece are determined. The first workpiece is processed based upon the routing and the schedule. A metrology data or a tool state data relating to the processing of the first workpiece is acquired. A determination is made as to whether a process error has occurred based upon at least one of the metrology data and the tool state data. The routing or the schedule relating to the second workpiece is automatically modified based upon a determination that the process error has occurred. An automated modification of a process material delivery process for processing the second workpiece is performed based upon the modifying at least one of the routing or the schedule.

In another aspect of the present invention, a method is provided for performing an automated process flow adjustment. A process flow for processing a first workpiece and a second workpiece is determined. The process flow comprises a predetermined routing and scheduling for directing the first and second workpieces to a plurality of processing tools. The first workpiece is processed based upon the routing and the schedule. An impasse relating to the process flow is detected. The routing or the schedule relating to the second workpiece is dynamically modified based upon the impasse. An automated modification of a process material delivery process is performed for processing the second workpiece.

In another aspect of the present invention, a method is provided for performing an automated process flow adjustment. A first process flow for routing a first workpiece from a first processing tool to a second processing tool is determined. The first workpiece using the first and second processing tools are processed. A determination is made as to whether a process error based upon processing the first workpiece has occurred. A second process flow for routing a second workpiece from the first processing tool to a third processing tool is determined in response to the process error. A modeling relating to material requirements of the first, second, and third processing tools is performed. An automated modification of a process material delivery process is performed for processing the second workpiece based upon the modeling and for providing load balance of the material.

In another aspect of the present invention, an apparatus is provided for performing an automated process flow adjustment. The apparatus comprises means for processing a workpiece based upon a routing plan and a predetermined schedule, means for performing a fault detection relating to the processing of the workpiece, means for modifying dynamically at least one of the predetermined routing plan and the predetermined schedule based upon the fault detection; and means for modifying dynamically a predetermined process material delivery plan. The modification of the material delivery plan is based upon the modifying of routing plan or modifying of the predetermined schedule.

In another aspect of the present invention, a system is provided for performing an automated process flow adjustment. The system of the present invention includes a processing tool to perform a process upon a workpiece based upon a predetermined routing plan and schedule; a metrology tool to acquire metrology data relating to the process performed on the workpiece to provide metrology data; a tool state data sensor unit to acquire tool state data; a material handling system to control delivery material to the processing tool; and a controller operatively coupled to the processing tool, metrology tool, tool state data sensor unit. The controller is adapted to perform a fault detection analysis relating to the processing of the workpiece to determine a modification of the routing of the wafer and the material delivery.

In yet another aspect of the present invention, a computer readable program storage device encoded with instructions is provided for performing an automated process flow adjustment to a perceived impasse in the process flow. The computer readable program storage device is encoded with instructions that, when executed by a computer, performs a method, comprising: processing a workpiece based upon a routing plan and a predetermined schedule; performing a fault detection relating to the processing of the workpiece; modifying dynamically at least one of the predetermined routing plan and the predetermined schedule based upon the fault detection; and modifying dynamically a predetermined process material delivery plan based upon at least one of the modifying of the routing plan and modifying of the predetermined schedule.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

The present invention will now be described with reference to the attached figures. Various structures, computers, process tools, and systems are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

There are many discrete processes that are involved in semiconductor manufacturing. Workpieces (e.g., semiconductor wafers 105, semiconductor devices, etc.) are typically stepped through multiple manufacturing process tools. Embodiments of the present invention provide for performing an automated response to a downstream event in a process flow. An impasse or fault condition in a downstream location of a process flow may be detected by embodiments of the present invention. Based upon this detection, a rerouting of wafers and/or a rescheduling of one or more process tasks may be performed. For example, various wafer lots may be automatically rerouted or rescheduled for processing based upon a detected impending process flow impasse. This may also include rerouting wafers, adjusting flow of wafers throughout a series of processes, altering material handling systems to perform load balancing of process materials, etc. The load balancing process may include a substantial balancing of process material load throughout various portions (e.g., various tools) of a processing system based upon activity. For example, an automated transportation of process materials may be altered to correspond with the rerouting of wafers as a result of a predicted process flow interruption.

Embodiments of the present invention may also be used to reduce system degradation. During a process flow, a portion of the system may degrade, e.g., one or more chambers in a processing tool may perform below predetermined expectations, factory utilization may exceed a predetermined capacity-threshold, causing degradation in the materials delivery components, etc. When a potential degradation of a system component is detected, automated rerouting of wafers away from that component may be performed. Additionally, process materials originally intended for the potentially degrading component may be automatically rerouted to alternative components (e.g., processing tools) that have been targeted to receive the rerouted wafers.

Figure 3:
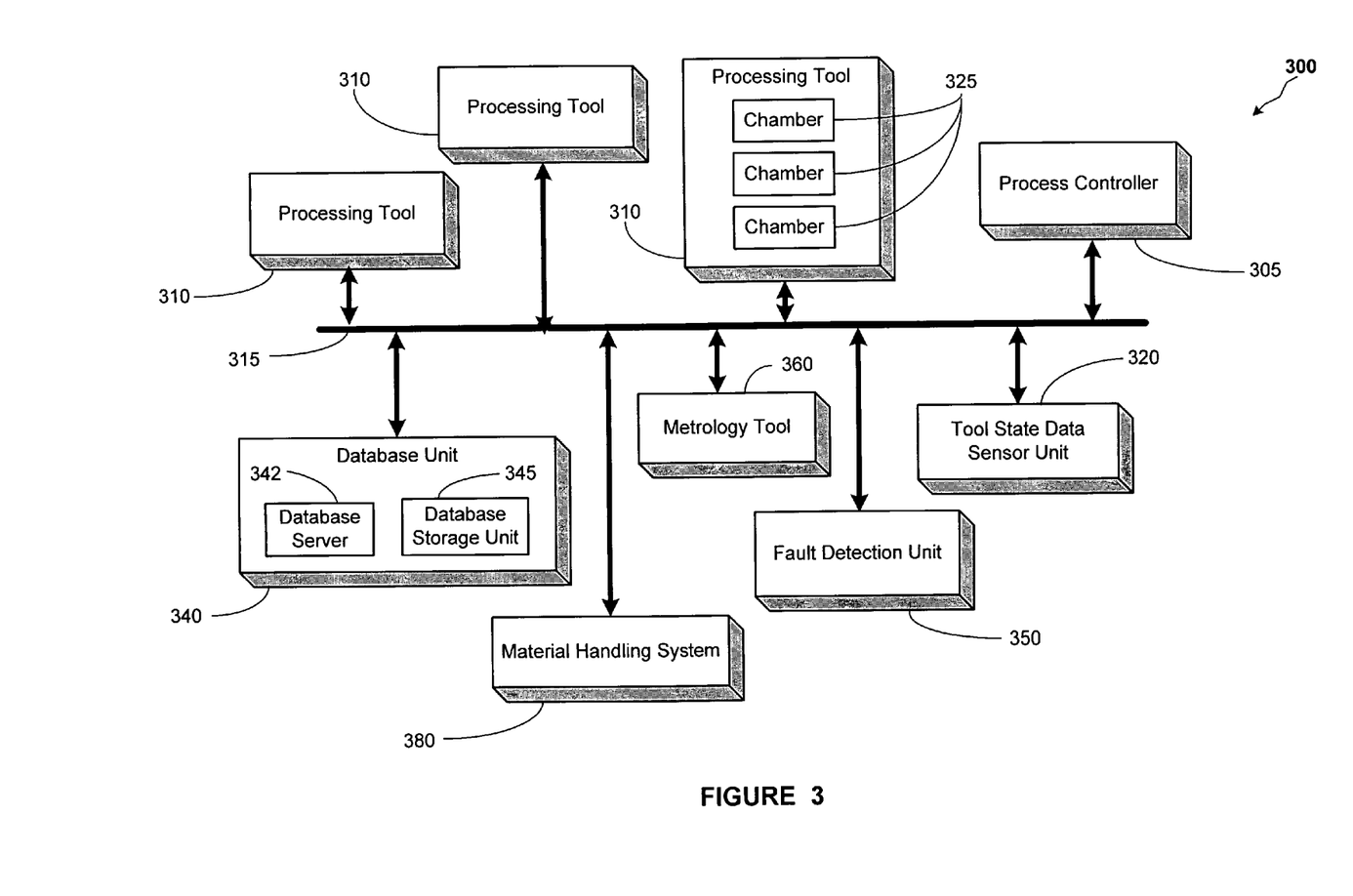
FIG. 3 illustrates a block diagram of a system depicting a process controller for controlling a plurality of factory components, in accordance with one illustrative embodiment of the present invention.

Turning now to FIG. 3, a system 300 in accordance with embodiments of the present invention is illustrated. A process controller 305 in the system 300 is capable of controlling various operations relating to a plurality of processing tools 310. The processing tools 310 may comprise a plurality of chambers 325, each of which may process wafers. The system 300 is also capable of acquiring manufacturing-related data, such as metrology data related to processed semiconductor wafers 105, tool state data, and the like. The system 300 may also comprise a metrology tool 360 to acquire metrology data related to the processed semiconductor wafers 105.

The system 300 may also comprise a database unit 340. The database unit 340 is provided for storing a plurality of types of data, such as manufacturing-related data, data related to the operation of the system 300 (e.g., the status of the processing tool 310, the status of semiconductor wafers 105, etc.). The database unit 340 may store tool state data relating to a plurality of process runs performed by the processing tool 310. The database unit 340 may comprise a database server 342 for storing tool state data and/or other manufacturing data related to processing of wafers, into a database storage unit 345.

The system 300 may also comprise a tool state sensor unit 320 for acquiring tool state data. The tool state data may include pressure data, temperature data, humidity data, gas flow data, various electrical data, and the like. Exemplary tool state data for an etch tool may include gas flow, chamber pressure, chamber temperature, voltage, reflected power, backside helium pressure, RF tuning parameters, etc. The tool state data may also include data external to the processing tool 310, such as ambient temperature, humidity, pressure, etc. A more detailed illustration and description of the tool state sensor unit 320 is provided in FIG. 4 and accompanying description below. The tool state sensor unit 320 may also comprise a tool state data analysis unit 460, which is capable of analyzing the tool state data. A more detailed description of the tool state sensor unit 320 is provided in FIG. 4 and accompanying description below.

The system 300 may also comprise a fault detection and classification (FDC) unit 350. The FDC unit 350 is capable of providing data relating to faults during processing of semiconductor wafers 105. Fault detection analysis performed by the fault detection and classification unit 350 may include analysis of tool state data and/or metrology data. The FDC unit 350 may correlate particular tool state data to errors detected on the processed semiconductor wafer 105 by analyzing the metrology tool data. For example, particular errors, such as critical dimension errors discovered on the processed semiconductor wafers 105 may be correlated to particular gas flow rates or temperature data relating to tool state data. The fault detection analysis performed by the FDC unit 350 may also include analyzing data from in situ sensors integrated into the processing tools 310. Based upon the fault detection analysis provided by the FDC unit 350, the system 300 may perform a modification to a previously or predetermined routing scheme determined by the system 300.

The system 300 is also capable of performing analysis of process variations to perform rerouting and/or rescheduling of various process tasks. One common technique for tracking and analyzing manufacturing process variation is called statistical process control (SPC). SPC is typically used to gauge the stability of a manufacturing process over time via predetermined, charted SPC data that document historical process performance. The system 300 is capable of performing SPC analysis of the detected variations of in the system 300. When SPC data regarding one or more wafers processed through a given tool 310 or a set of tools 310 indicates a characteristic of the wafers has departed from an acceptable range established for the characteristic, an alarm condition may be signaled. This alarm condition may prompt the process controller 305 to place the processing tool(s) 310 in a shutdown mode or in a low utilization mode. In such a situation, a troubleshooting procedure may be initiated, the object of which is to clear the alarm condition (i.e., solve the problem) and to return the processing tool(s) to full service as quickly as possible. The troubleshooting procedure may include rerouting a wafer, a batch of wafers, and/or one or more lots of wafers, to alternative process paths. Further, the troubleshooting procedure may include rescheduling various process steps.

As described above, processing tools 310 may include a plurality of chambers 325 as illustrated in FIG. 3. In some examples, a particular processing tool 310 may include three chambers 325 that are capable of independently processing wafers. The system 300 may also include a material handling system 380 that is capable of routing process materials to various portions of the system 300. The material handling system 380 may include various controllers, material delivery vehicles, material storage locations, etc. As process routing and/or scheduling change, the material handling system 380 is capable of reassessing material requirements across various portions of the system 300. Based upon this reassessment, the material handling system 380 may perform a load balancing function to balance the material load across the system 300 based upon expected material utilization.

The process controller 305 is capable of monitoring various portions of the system to determine whether an impasse or fault condition may exist in a downstream location of a process flow. The term "impasse" may refer to any interruption and/or anomalies in the normal process flow. For example, the process controller may detect that a particular chamber 325 of a downstream processing tool 310 has become offline. This detection may prompt a calculation of one or more efficient, alternative paths for processing the wafers. The fault conditions may be based upon various manufacturing data, such as metrology data, tool state data, fault detection analysis, SPC analysis, etc.

Upon a determination of fault condition or an impasse in the process flow, the material handling system 380 may readjust flow of process material throughout the system 300 to perform a load balancing function. The load balancing function provides for delivering appropriate amount of process material(s) to the various process locations, e.g., processing tools 310. The process controller 305 is capable of analyzing various manufacturing data such as metrology data, fault detection data, SPC analysis data, and/or tool state data to predict whether deviation(s) from normal process operations in the process flow may occur. Based upon this prediction, an automated routing and/or rescheduling may be performed to maintain acceptable process flow. This process also includes performing a load balancing function by the material handling system 380 to assure that sufficient material is delivered to targeted locations of the system 300, while reducing excessive process material from accumulating at an undesirable location. A more detailed description and illustration of the material handling system 380 is provided in FIG. 5 and accompanying description below.

Figure 4:
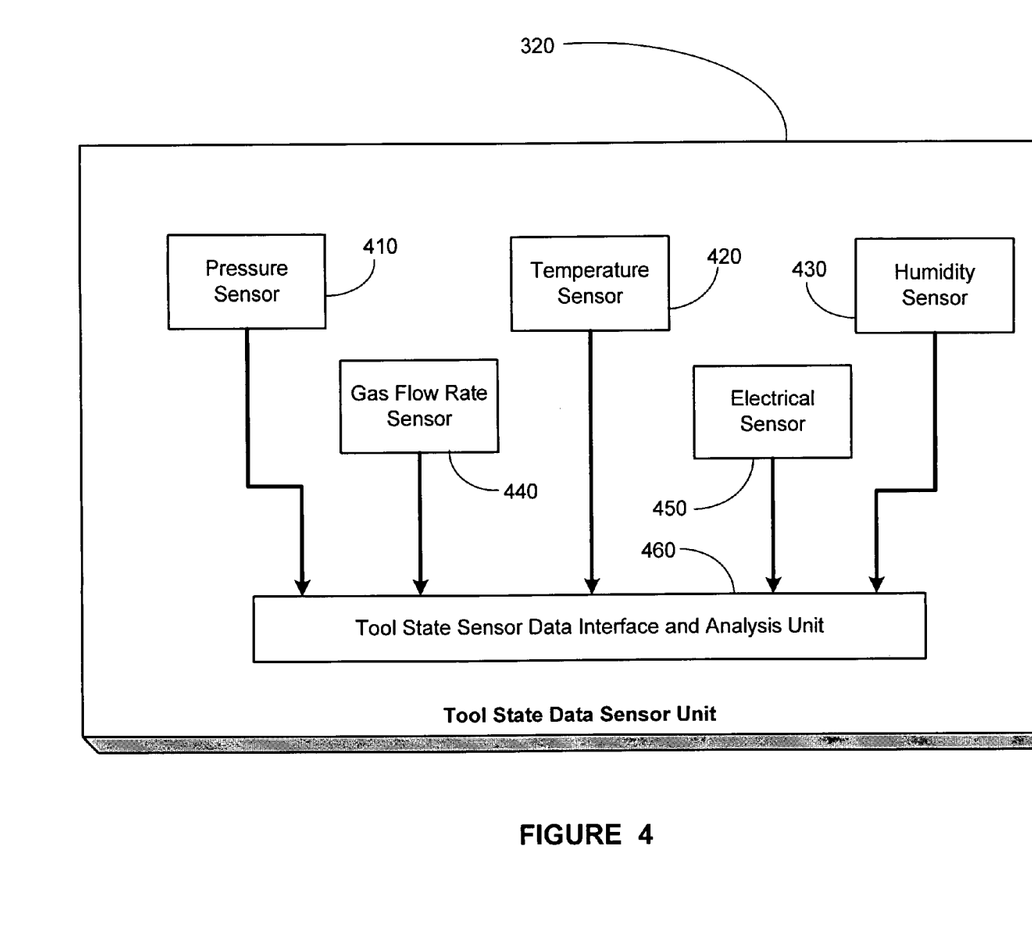
FIG. 4 illustrates a more detailed block diagram representation of a tool state data sensor unit of FIG. 3, in accordance with one illustrative embodiment of the present invention.

Turning now to FIG. 4, a more detailed block diagram depiction of the tool state data sensor unit 320 illustrated in FIG. 3 is provided. The tool state data sensor unit 320 may comprise any of a variety of different types of sensors, e.g., a pressure sensor 410, a temperature sensor 420, a humidity sensor 430, a gas flow rate sensor 440, and an electrical sensor 450, etc. In an alternative embodiment, the tool state data sensor unit 320 may comprise in situ sensors that are integrated into the processing tool 310. The pressure sensor 410 is capable of detecting the pressure within the processing tool 310 or chamber(s) 325. The temperature sensor 420 is capable of sensing the temperature in various locations of the processing tool 310 or chamber(s) 325. The humidity sensor 430 is capable of detecting the relative humidity at various portions in the processing tool 310, or of the surrounding ambient conditions. The gas flow rate sensor 440 may comprise a plurality of flow-rate sensors that are capable of detecting the flow-rate of a plurality of process gases utilized during processing of semiconductor wafers 105. For example, the gas flow rate sensor 440 may comprise sensors that can detect the flow rate of gases such as $NH_3$, $SiH_4$, $N_2$, $N_2O$, and/or other process gases.

In one embodiment, the electrical sensor 450 is capable of detecting a plurality of electrical parameters, such as the current provided to a lamp used in a photolithography process. The tool state data sensor unit 320 may also comprise other sensors capable of detecting a variety of manufacturing variables known to those skilled in the art having benefit of the present disclosure. The tool state data sensor unit 320 may also comprise a tool state sensor data interface 460. The tool state sensor data interface 460 may receive sensor data from the various sensors that are contained within, or associated with, the processing tool 310, and/or the tool state data sensor unit 320 and transmit the data to the process controller 305.

Figure 5:
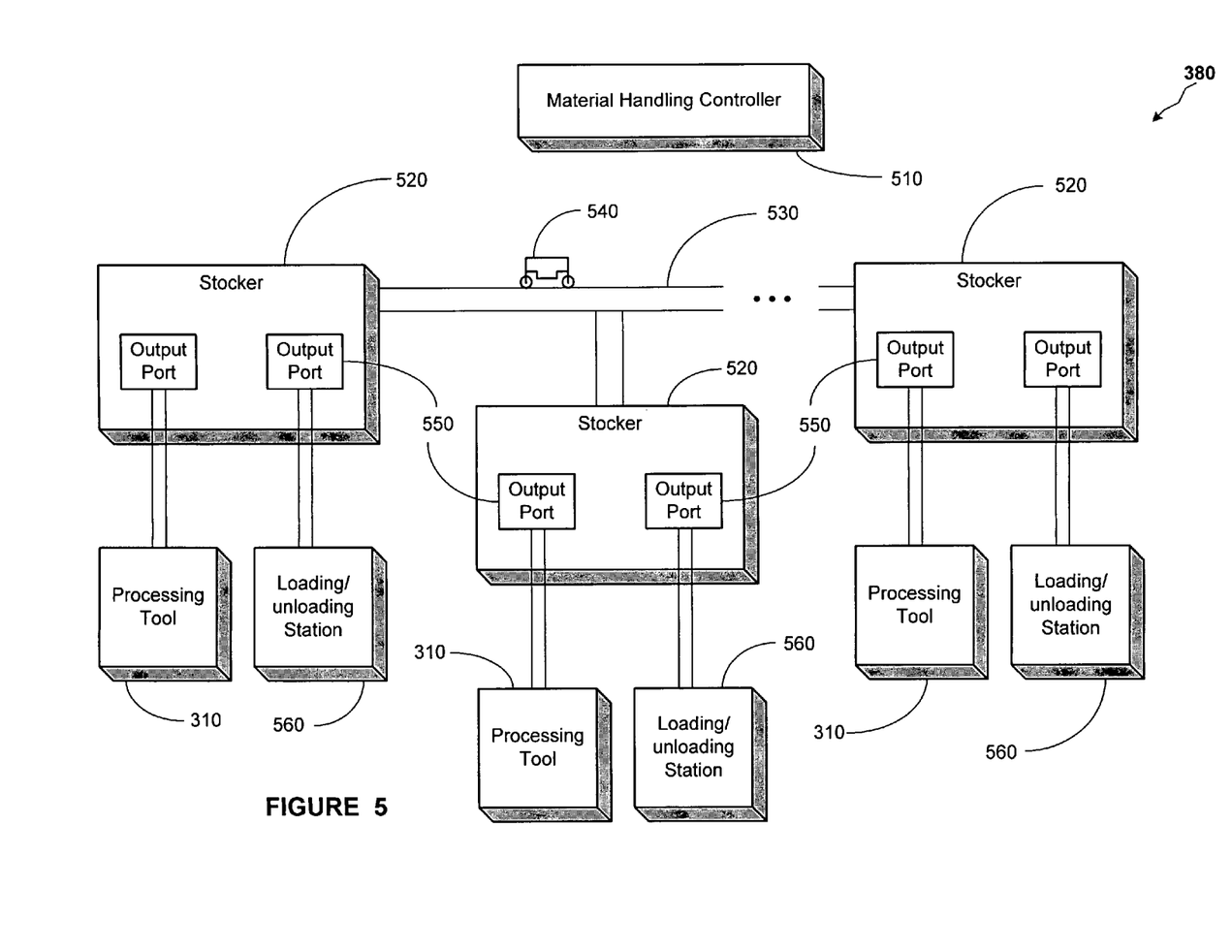
FIG. 5 depicts a stylized block diagram depiction of a plurality of a material handling systems of FIG. 3, in accordance with one illustrative embodiment of the present invention.

Turning now to FIG. 5, a block diagram depiction of the material handling system 380 in accordance with one illustrative embodiment of the present invention is depicted. The material handling system 380 may comprise a material handling controller 510 that is capable of controlling the operations of various components of the system 380. The material handling system (MHS) 380 may be automated such that flow of process materials may be automatically altered and rerouted to various alternative components of the system 300, e.g., alternative processing tools 310.

The MHS 380 may comprise a plurality of material handling components, such as stockers 520. Stockers 520 are material handling units that are capable of receiving, storing, and routing process materials in response to commands from a controller, such as the material handling controller 510 and/or the process controller 305. Numerous stockers 520 may be strategically positioned at various locations in a manufacturing facility for efficiently routing process material to the components of a system 300. The stockers 520 are capable of storing a plurality of types of process materials. Additionally, the stockers 520 may comprise components that are capable of extracting specific process material and transferring them to a specific location in the system 300, e.g., to a processing tool 310, to a manual loading/unloading area, and/or directly to another stocker 520.

The stockers 520 may comprise one or more input/output ports 550. The input/output ports 550 may be designed to facilitate manual and/or automatic transfer of materials to and/or from the stockers 520. For example, as illustrated in FIG. 5 one input/output port 550 of a stocker 520 may be operatively coupled to a processing tool 310 such that automated transfer of material from a stocker 520 to a selected processing tool 310 may be performed. Further, another input/output port 550 in the stocker 520 may be operatively coupled to a loading/unloading station 560, where an operator may extract material from, or deliver material into, the stocker 520 via the input/output port 550. Additionally, a single input/output port 550 of a stocker 520 may be operatively coupled to a plurality of processing tools 310.

The stockers 520 may be interconnected via one or more transport lines 530. In one embodiment, the transport line 530 may comprise a rail system upon which one or more transport device(s) 540 may travel while carrying materials to and from the stockers 510. The operations of the transport device 540 may be controlled by the material handling controller 510, which in turn may receive data (e.g., material transport instructions, etc.) from, and/or transmit data (e.g., material status data, etc.) to, the process controller 305. In addition to transporting materials to processing tools 310, the transport lines 530 provides for material transfer directly from one stocker 520 to another. In one embodiment, material delivery from the stocker 520 to a processing tool 310 is performed via the input/output port 550. Additionally, material may be extracted from, and/or delivered to, the stocker 520 (e.g., manually loading and unloading material from a stocker 520) via the input/output port 550. The transport system 530 may comprise a rail-based movement system, a magnetic-based movement system, an electrical-based movement system, a vacuum-based movement system, etc.

The present invention provides for coordinating the operation of the material handling system 380 to coincide with any rerouting or rescheduling of process operations based on anomalies or faults detected in the system 300. Based upon a predictive analysis relating to material requirements, the material handling controller 510 may initiate the transportation of process material to various system components and/or between various stockers 520.

Figure 6:
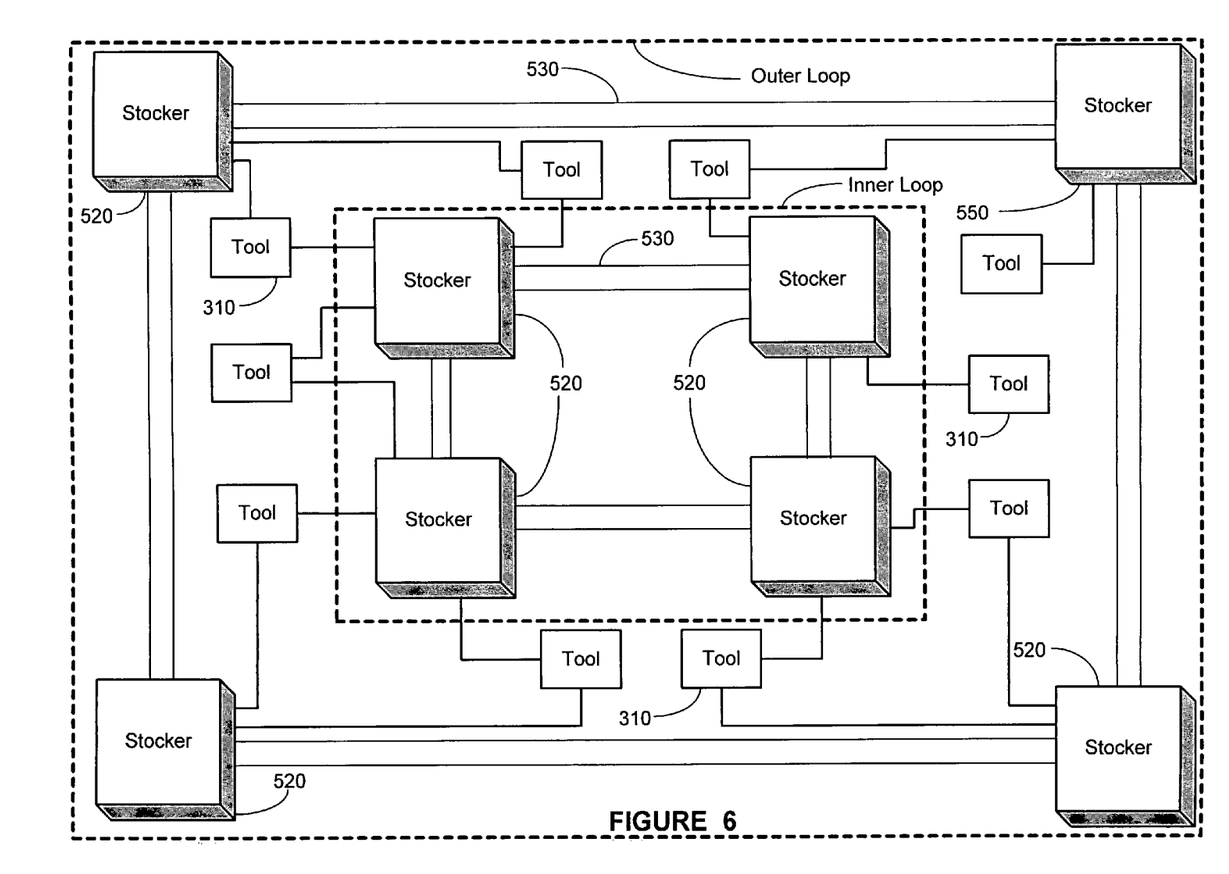
FIG. 6 illustrates an inner loop and outer loop associated with a material delivery system, in accordance with an illustrative embodiment of the present invention.

Turning now to FIG. 6, a stylized block diagram depiction of a material delivery system layout, in accordance with one illustrative embodiment of the present invention, is provided. The stockers 520 may be positioned in a manufacturing facility or fab in the form of one or more loops. For example, one set of stockers 520 may be positioned in an inner-loop configuration, wherein a second set of stockers 520 may be positioned in an outer loop configuration (see illustration in FIG. 6). Material flow in the inner loop and the outer loop may be controlled such that an efficient, substantially continuous delivery of appropriate process material may be achieved.

Additionally, the inner loop and outer loop paths provide flexibility for rapid changes in originally planned material deliveries. These changes may be prompted by anomalies or faults detected at any position in the system 300. For example, the malfunction of a particular processing tool 310 may cause a recalculation, prompting a rerouting and/or rescheduling of various components of the system 300. Data relating to the rerouting and rescheduling may be used to predict or model material delivery requirements. In response, the material flow in the inner loop and/or the outer loop may be modified. Transfer of material may take place between stockers 520 and factory components, between stockers 520 within the inner loop, between stockers 520 within the outer loop, and/or between a stocker 520 in the inner loop and a stocker 520 in the outer loop.

Based upon process anomalies or faults detected by the process controller 305, various scheduling or routing modifications may be automatically performed. In response to the scheduling and/or routing modifications, one or more automated adjustment(s) relating to the material transport throughout the inner and outer loops may be performed. Additionally, if a malfunction occurs with a particular stocker 520 or a set of stockers 520 in either the outer loop or the inner loop, the operation of the inner loop and the outer loop may become severely disrupted. As a result, delivery of materials required for scheduled processing of wafers may be interrupted due to a lack of appropriate process material. The process controller 305 may detect a problem associated with the inner loop and/or the outer loop and alert the material handling controller 510. Upon this alert, the operation of the inner loop or the outer loop process material delivery may be modified. In some cases, where substantially the entire inner loop is interrupted, the outer loop may be prompted to perform at least a portion of the functions relating to material delivery that would have been performed by the disabled inner loop, or vice versa.

In one embodiment, the process controller 305 informs the material handling system 380 of particular changes in the routing or scheduling of operation of various components of the system 300. In response, the material handling controller 510 may perform various calculations to predict process material requirements for various components of the system 300. Upon a process flow interruption, an automated calculation of modified process material requirements may be performed. Using these calculations, modifications relating to the materials flow of the inner loop and/or the outer loop may be performed to automatically re-direct process material to various processing tools.

The process controller 305 may comprise a manufacturing model that provides for an overall assessment of the process flow within a manufacturing facility. Based upon this manufacturing model, the process controller 305 is capable of substantially continuously calculating and updating data relating to the completion of various processes in the system. The process controller 305 is also capable of automatically prompting rerouting of wafers, adjusting material handling processes, etc., based upon faults or anomalies in the system 300. The material handling system 380 may then be prompted to re-direct originally scheduled process deliveries to accommodate the modified routing and scheduling of processes.

Figure 7:
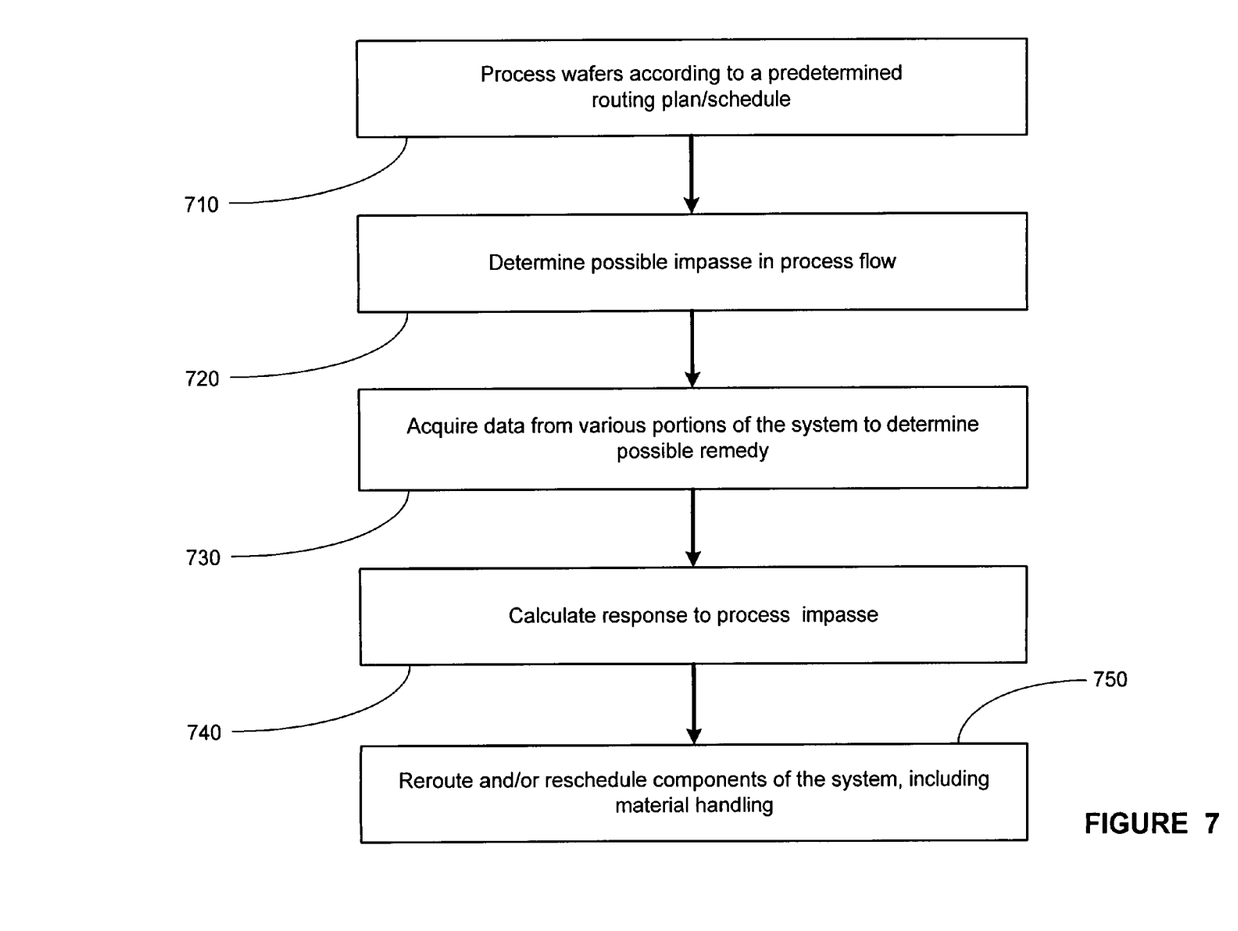
FIG. 7 illustrates a flow chart depiction of steps associated with a method in accordance with one illustrative embodiment of the present invention.

Turning now to FIG. 7, a flowchart depiction of a method in accordance with one illustrative embodiment of the present invention is provided. Wafers may be processed according to a predetermined routing plan as well as predetermined process schedule (block 710). The system 300 may make a determination as to a possible impasse in the process flow (block 720). This determination may be made by performing periodic or substantially constant checks (e.g., performing diagnostic check of various components of the system 300, such as the processing tools, metrology tools, etc.) of the overall performance of the system 300. Additionally, status signals from various components of the system 300 may be received by the process controller 305 in a predetermined periodic manner and/or upon request. The results from the diagnostic checks and/or the status signals may provide the process control 305 an indication of the condition (e.g., possible impasse) of the system 300 as a whole, or various conditions associated with individual components or a group of components of the system 300.

The impasse may include various process anomalies, faults, tool-related problems, unusual tool state data results, disabled chambers in a tool 310, unusual metrology results, etc. The impasse may also relate to a change in the process flow rate, indicating that an error condition may have occurred in the system 300. The impasse may also relate to a determination that the factory capacity has exceeded a predetermined threshold (e.g., factory operations of above 85% utilization of various factory components of the fab, or of the fab as a whole). Exceeding the predetermined factory capacity may cause degradation in a process flow, particularly in delivery of process materials to various component of the system 300. In response to the detection of the possible impasse, an overall assessment of the process flow in a manufacturing facility may be performed. Various types of process analysis data, such as SPC analysis data, tool state data, metrology data, tool diagnostic data, etc., may be analyzed to determine whether an impasse has occurred or may occur within a reasonable certainty.

Upon a determination of a possible impasse in the process flow, the system 300 may acquire data from various portions of the system to determine a possible remedy (block 730). This may include acquiring metrology data, tool state data, SPC analysis data, tool diagnostics data, etc. Various calculations and/or modeling of process modifications may be performed using the acquired manufacturing data in order to respond to the process impasse (block 740). The calculation process may include adjusting a manufacturing model relating to the entire system 300. The calculations and/or modeling may also include determining process modifications, such as performing rerouting and/or modifying predetermined process schedules. The calculations relating to the rerouting and rescheduling of process tasks may also depend on various factors, such as availability of processing tools, availability of process materials, availability of resources to transport wafers and/or materials to alternative locations based upon possible rerouting and rescheduling of process tasks. In one embodiment, the calculations and/or modeling may be performed in a substantially real time basis. The rerouting and rescheduling processes may include rerouting an individual wafer, an individual lot, a plurality of lots, and/or various components of an entire manufacturing facility or fab. The modeling described above may relate to predicting material requirements of various processing tools 310 in response to the rerouting and rescheduling described herein.

Based upon the calculations and/or modeling described above, the rerouting and/or rescheduling of various components of the system may be performed (block 750). The rerouting and/or rescheduling may include rerouting wafers (e.g., rerouting wafers to different tools, redirecting additional wafers to a particular tool, etc.), rescheduling process tasks, increasing or decreasing the frequency of metrology measurements, adjusting material handling (modifying a predetermined process material delivery plan), etc. Based upon rescheduling of wafers, or rescheduling of various processing tools, adjustments to the material flow system are performed such that efficient delivery of process materials provide for substantially continuous flow of process operations. The rerouting and/or rescheduling process may be performed in an automated, dynamic fashion. This may include performing the rerouting and/or rescheduling process in a substantially real time manner without manual input from an operator.

The material handling controller 510 may perform a prediction of a new material delivery protocol relating to the modified routing and/or rescheduling of various components of the system 300. The delivery of materials may be performed such that a load balance of the materials across the system 300 is substantially achieved. The load balance may provide a reduction of one particular portion of the fab being overloaded with material and/or another portion of the fab lacking process material. The load balancing may be performed such that smoother process flow is provided, where a set of wafers arrives at a processing tool 310 substantially within a time period in which the material required to process the wafers also arrive.

The rerouting, rescheduling, and/or load balancing described herein may be performed in an automatic, dynamic fashion, such that direct or manual input from an operator is not necessary. Based upon the modified rerouting, rescheduling, and/or load balancing provided herein, more efficient process flow may be achieved. For example, when the process controller 305 detects that one chamber of a particular processing tool is malfunctioning, a reduction in the number of wafers that is delivered to that processing tool 310 may be performed, while rerouting the remaining wafers to another tool 310. This may call for a stocker to stocker transfer of material to a different stocker 520 that is proximate to the location where additional wafers are being sent for processing. As another example, an intentional shut down of a processing tool 310 may be performed for maintenance. Based upon this shut down, a rescheduling and rerouting of one or more wafers may be performed. Based upon this rerouting and rescheduling, the material handling controller 510 may predict the change in the materials required at the new location where the wafers are being transferred. Therefore, process flow is maintained despite anomalies or faults at a downstream location.

Illustrative embodiments of the present invention provide for an assessment of faults and/or anomalies in a process flow. Based upon detection of this anomaly or fault, automated rescheduling and/or rerouting may be performed. The reaction to the anomaly or fault may also include a change in the material handling process to accommodate rerouting and rescheduling such that process flow may be substantially maintained. Utilizing embodiments of the present invention, more efficient detection in the reaction to downstream faults in a process flow may be performed to achieve or maintain desirable process flows.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular embodiments disclosed above may be altered or modified and all such variations are considered within the scope and spirit of the invention. Accordingly, the protection sought herein is as set forth in the claims below.

What is claimed:

1. A method, comprising:
processing a workpiece based upon a routing plan and a predetermined schedule;
performing a fault detection relating to said processing of said workpiece;
modifying dynamically at least one of said predetermined routing plan and said predetermined schedule based upon said fault detection; and
modifying dynamically a predetermined process material delivery plan based upon at least one of said modifying of said routing plan and modifying of said predetermined schedule.

2. The method of claim 1, wherein processing said workpiece further comprises processing a semiconductor wafer.

3. The method of claim 1, further comprising processing at least one subsequent workpiece.

4. The method of claim 1, wherein routing said workpiece based upon a predetermined routing plan comprises routing said workpiece to a plurality of processing tools.

5. The method of claim 1, wherein performing said fault detection relating to said processing of said workpiece comprises performing at least one of a metrology data analysis, a tool state data analysis, and a statistical process control analysis.

6. The method of claim 5, wherein performing said tool state data analysis comprises correlating a process result to at least one of a pressure data, a humidity data, a temperature data, and a gas flow rate data relating to a chamber of a processing tool.

7. The method of claim 1, wherein performing said fault detection comprises detecting a malfunction relating to the operation of at least one chamber in a processing tool.

8. The method of claim 1, wherein modifying dynamically said predetermined process material delivery plan comprises modifying a predetermined route or schedule relating to the operation of an automated material handling unit.

9. The method of claim 8, wherein modifying said predetermined route or schedule of the operation of an automated material handling unit comprises determining the availability of a processing tool, a metrology tool, and a process material.

10. The method of claim 8, wherein modifying said predetermined route or schedule of the operation of an automated material handling unit comprises performing a load balancing process to provide for balance of process material throughout a fab.

11. A method, comprising:
monitoring a process flow relating to processing a workpiece;
detecting a change in said process flow;
performing an automated modification of a process material delivery process for delivery of material used in processing said workpiece based upon said change in the process flow to provide for balance of process material throughout a fab; wherein performing said automated modification of said process material delivery process comprises performing a load balancing process to provide for balance of process material throughout a fab.

12. The method of claim 11, further comprising processing at least one subsequent workpiece.

13. A method, comprising:
determining a routing and a schedule for processing a first workpiece and a second workpiece;
processing said first workpiece based upon said routing and said schedule;
acquiring at least one of a metrology data and a tool state data relating to said processing of said first workpiece;
determining whether a process error has occurred based upon at least one of said metrology data and said tool state data;
modifying at least one of said routing and said schedule relating to said second workpiece based upon a determination that said process error has occurred; and
performing an automated modification of a process material delivery process for processing said second workpiece based upon said modifying at least one of said routing and said schedule; wherein performing said automated modification of said process material delivery process comprises performing a load balancing process to provide for balance of process material throughout a fab.

14. The method of claim 13, further comprising processing said second workpiece.

15. An apparatus, comprising:
means for processing a workpiece based upon a routing plan and a predetermined schedule;
means for performing a fault detection relating to said processing of said workpiece;
means for modifying dynamically at least one of said predetermined routing plan and said predetermined schedule based upon said fault detection; and
means for modifying dynamically a predetermined process material delivery plan based upon at least one of said modifying of said routing plan and modifying of said predetermined schedule.

16. A computer readable program storage device encoded with instructions that, when executed by a computer, performs a method, comprising:
processing a workpiece based upon a routing plan and a predetermined schedule;
performing a fault detection relating to said processing of said workpiece;
modifying dynamically at least one of said predetermined routing plan and said predetermined schedule based upon said fault detection; and
modifying dynamically a predetermined process material delivery plan based upon at least one of said modifying of said routing plan and modifying of said predetermined schedule.

17. The computer readable program storage device encoded with instructions that, when executed by a computer, performs the method of claim 16, further comprising processing at least one subsequent workpiece.

* * * * *